June 11, 1935.  H. A. WAGNER  2,004,542
BAIL HOLDERS
Filed Jan. 9, 1934  2 Sheets-Sheet 1

Inventor
H. A. Wagner
By Clarence A. O'Brien
Attorney

June 11, 1935.  H. A. WAGNER  2,004,542

BAIL HOLDERS

Filed Jan. 9, 1934   2 Sheets-Sheet 2

Inventor

H. A. Wagner

By Clarence A. O'Brien
Attorney

Patented June 11, 1935

2,004,542

UNITED STATES PATENT OFFICE 2,004,542

BAIL HOLDER

Harlan A. Wagner, Ruthven, Iowa

Application January 9, 1934, Serial No. 705,926

1 Claim. (Cl. 220—96)

This invention appertains to new and useful improvements in bail holders for cooking utensils.

The principal object of the present invention is to provide a holder for installation on cooking utensils whereby the bail can be retained in an upright position so that the handle thereof will not engage the utensil and become charred or otherwise disfigured.

Other important objects and advantages of the invention will become apparent to the reader of the following specification.

In the drawings:—

Figure 1:
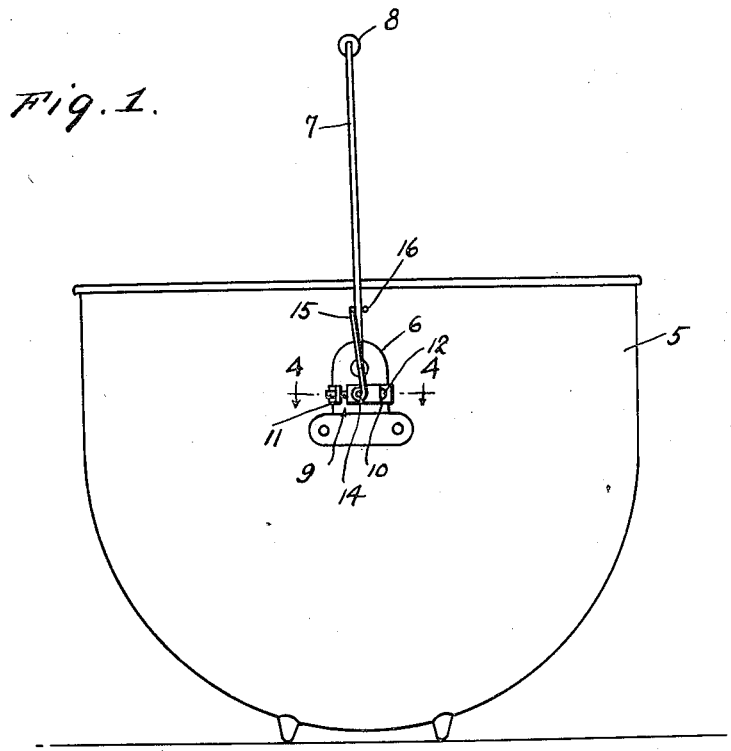
Figure 1 represents a side elevational view of a utensil, with the novel holder in position supporting the utensil bail.

Referring to the drawings wherein like numerals designate like parts, it can be seen that numeral 5 represents the utensil which is equipped with the ear members 6—6 to which the ends of the bail 7 are connected. The bail is provided with the usual wooden handle 8 at its intermediate portion.

Figure 4:
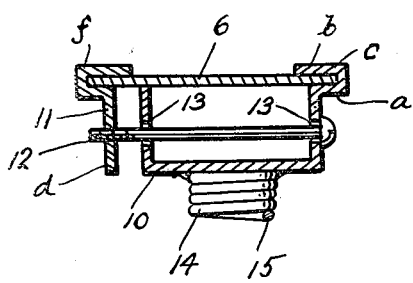
Figure 4 represents a sectional view taken substantially on line 4—4 of Figure 1.
Figure 5:
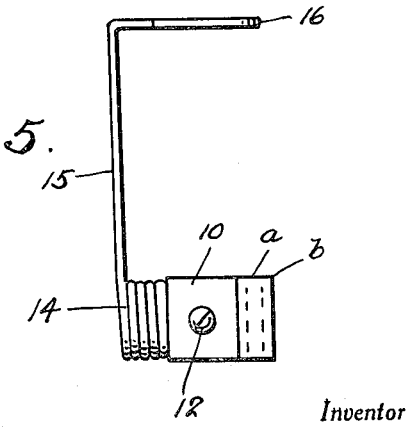
Figure 5 represents a side elevational view of the retainer detached from the utensil.

Numeral 9 generally refers to the novel retainer and this consists of a U-shaped member 10 having one leg portion bent outwardly at $a$ and backwardly, as at $b$ to define a grooveway $c$ for the reception of one vertical edge portion of one of the bail ears 6. Numeral 11 represents the other clamp section which consists of a plate $d$ having a hook formation $f$ at one end. The plate is provided with a threaded opening to receive the threaded portion of the bolt 12. The hook $f$ is adapted to receive the opposite longitudinal edge portion of the same bail 6, as in the manner substantially shown in Figure 4.

Obviously, when the bolt 12 is disposed through the openings 13 in the leg portions of the U-shaped clamp section 10 and engaged into the opening of the clamp section 11, the sections can be properly engaged with the edge portion of the corresponding ear 6 and by screwing the bolt through the sections 11, the sections can be drawn together into clamping engagement with the ear.

Figure 2:
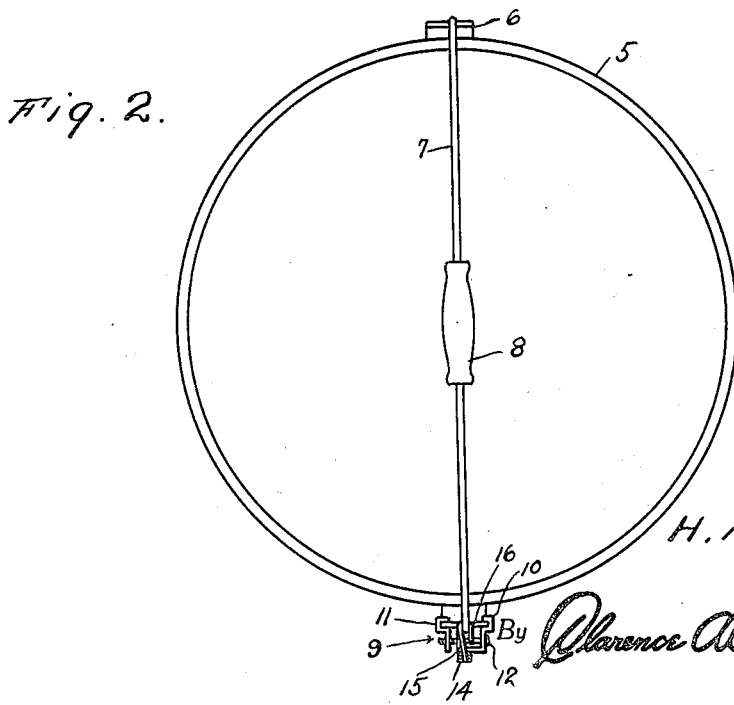
Figure 2 represents a top plan view of a utensil equipped with the novel retainer.
Figure 3:
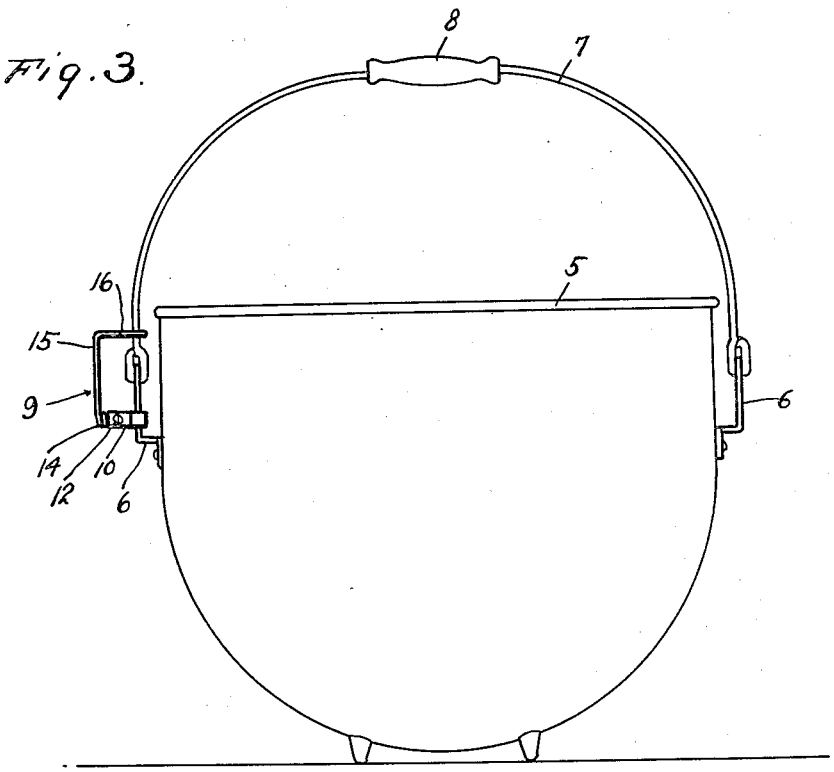
Figure 3 represents a front elevational view of the utensil, showing the retainer engaged with the utensil bail.

A coiled extensible spring 14 has one end secured to the bight portion of the clamp section 10. This spring has an upstanding extension 15 terminating in a laterally disposed hook member 16. This hook member can engage the corresponding end of the bail 7 and when engaged in the manner substantially shown in Figures 1, 2 and 3, will retain the bail in the upright position shown.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A bail holder for utensils having bail attaching ears, comprising a pair of ear engaging clamps, each of said clamps including a U-shaped member provided on the end of one of its leg portions with a channeled formation to receive one edge portion of the ear, a plate provided at one end with a channeled formation to receive the other edge of the ear, a clamp screw extending through the leg portions of the U-shaped member and being threaded through the plate so that by rotating the screw the channeled formations can be brought snugly against the edge portions of the ear, a bail engaging element, said bail engaging element consisting of an elongated spring wire convoluted at one end to provide a coiled spring, said spring being attached to the bight portion of the U-shaped member and disposed laterally therefrom, said wire being disposed upwardly from the outer end of the coil and then inwardly to provide an arm, said arm at its upper end being provided with a hook to engage a portion of the bail above the corresponding ear.

HARLAN A. WAGNER.